(12) United States Patent
Wilson, Sr.

(10) Patent No.: US 11,476,649 B1
(45) Date of Patent: Oct. 18, 2022

(54) SERVICE ENTRANCE HEADS AND METHODS

(71) Applicant: Laurin Thomas Wilson, Sr., Georgetown, SC (US)

(72) Inventor: Laurin Thomas Wilson, Sr., Georgetown, SC (US)

(*) Notice: Subject to any disclaimer, the term of this patent is extended or adjusted under 35 U.S.C. 154(b) by 0 days.

(21) Appl. No.: 17/402,518

(22) Filed: Aug. 14, 2021

(51) Int. Cl.
*H02G 3/22* (2006.01)
*H02G 3/04* (2006.01)

(52) U.S. Cl.
CPC .................... *H02G 3/0418* (2013.01)

(58) Field of Classification Search
CPC .......... H02G 3/0418; H02G 3/06; H02G 3/22; H02G 3/0437; H02G 3/04; H02G 3/24; H02G 3/26; H01B 17/583; H01B 17/66
USPC ............ 174/163 R, 79, 81, 93, 72 R, 80, 82, 174/40 R, 68.3, 68.1; 385/134, 135; 285/45, 179, 179.1; 248/68.1, 49
See application file for complete search history.

(56) References Cited

U.S. PATENT DOCUMENTS

| | | | | |
|---|---|---|---|---|
| 2,148,059 A * | 2/1939 | Dann | ...................... | H02G 3/22 174/81 |
| 2,739,999 A * | 3/1956 | Gill | ......................... | H02G 3/22 174/53 |
| 2,993,084 A * | 7/1961 | Curtiss | ..................... | H02G 3/22 285/179 |
| 3,328,513 A * | 6/1967 | Goldsobel | ................ | H02G 3/22 174/81 |
| 3,337,689 A * | 8/1967 | Rudolph | .................. | H02G 3/22 174/80 |
| 3,389,212 A * | 6/1968 | Dearie | ..................... | H02G 3/22 174/81 |
| 4,876,414 A * | 10/1989 | Johnson | ................... | H02G 3/22 174/81 |
| D324,853 S * | 3/1992 | Johnson | ...................... | D13/154 |
| D776,063 S * | 1/2017 | Cardin | ......................... | D13/156 |
| 11,146,048 B2 * | 10/2021 | Wilson, Sr. | ............ | H01B 17/66 |
| 11,362,501 B2 * | 6/2022 | Wilson, Sr. | ............. | H02G 3/24 |

* cited by examiner

*Primary Examiner* — Angel R Estrada
(74) *Attorney, Agent, or Firm* — L. Lawton Rogers, III

(57) ABSTRACT

An improved service entrance head including (a) a cap, (b) a cap support or collar adapted for mounting to a service conduit, and (d) an insulating service wire support or wire separator, that allows for replacement of an installed service entrance head with the service passing through the collar and separator without requiring that an end of the service be available. Both the collar and the wire separator may be segmented so that they can be removed from a position surrounding the service and reassembled around the service. Alternatively, both the collar and the insulating support/separator may have a gap through which the service may be inserted into the desired interior position. Methods of installation are disclosed.

22 Claims, 21 Drawing Sheets

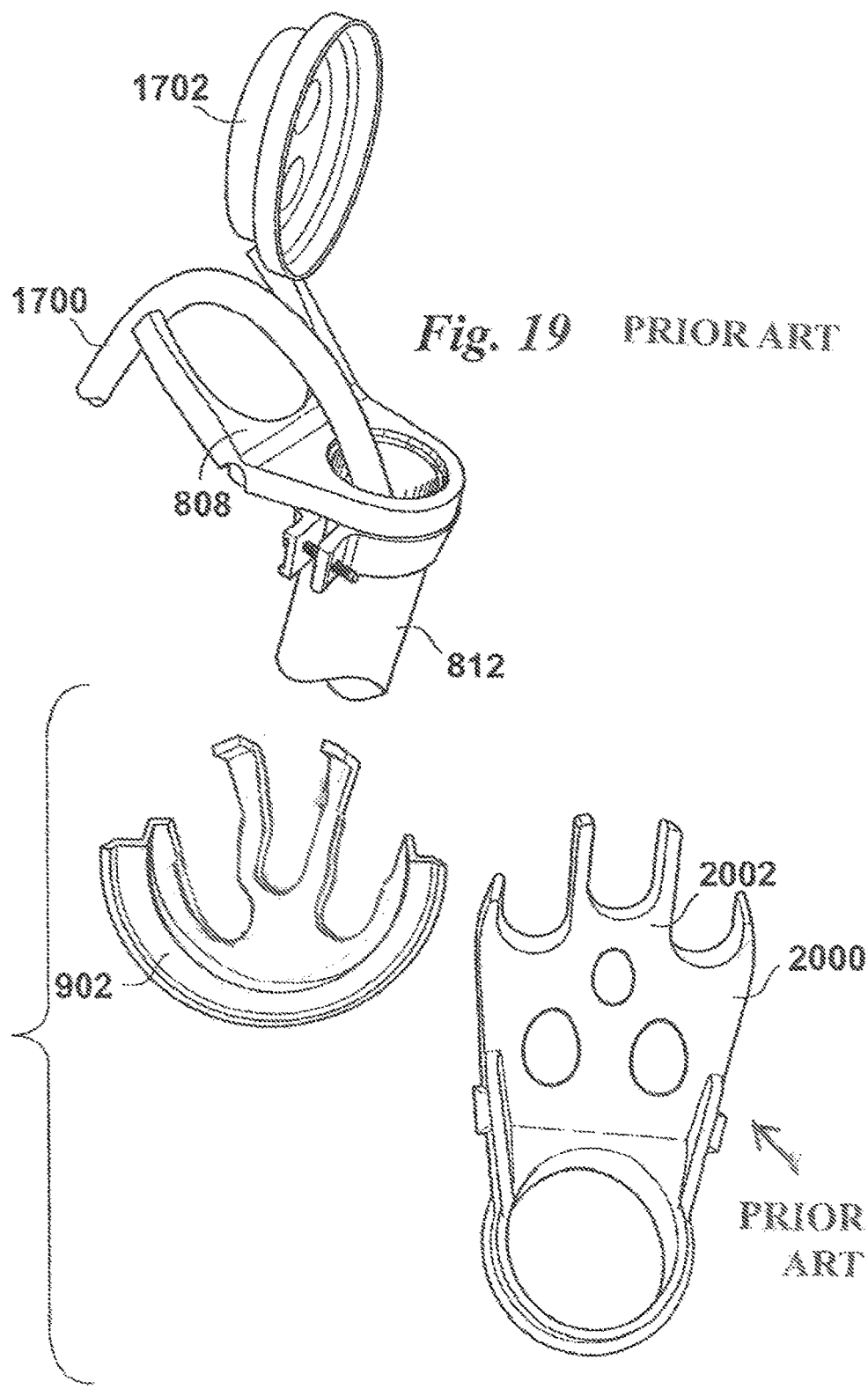

SERVICE ENTRANCE HEADS AND METHODS

RELATED APPLICATIONS

This application is a continuation in part of application Ser. No. 16/579,919 filed Sep. 24, 2019 (now U.S. Pat. No. 11,146,048), the entire content of which is hereby incorporated herein by reference, which in turn claims the priority of Provisional application Ser. No. 62/735,247 filed Sep. 24, 2018, the entire disclosure of which is hereby incorporated herein by reference.

BACKGROUND OF THE INVENTION

The present invention relates to an improved service entrance head that can be installed and/or replaced without requiring that the ends of the service pass therethrough.

A service entrance head—also called a weatherhead, weathercap, service head, service entrance cap, or gooseneck (slang)—is a weatherproof service drop entry point where overhead power, data, or telephone wires enter a building, or where wires transition between overhead and underground cables. At a building the wires enter a conduit (e.g., a protective pipe), and the service entrance head is a waterproof cap on the end of the conduit that allows the wires to enter without letting in water, insects, debris, etc. As explained in greater detail infra, the "service entrance head" (i.e., the entire device attached to the conduit through which the electrical "service" enters the conduit) is sometimes referred to as a "weathercap" while "cap" is also used for the participation hood that overlies the device. Similarly, the structure that secures the device to the conduit (generally referenced as a "clamp") is not to be confused with the "collar" or portion of the device that surrounds the end of the conduit, despite the fact that the same structure may be combined to perform both the collar and clamp functions and referred to by one or both names. Because the "collar" supports the "cap", it is sometimes referenced as the "cap support". Likewise, the "service" is the wires (or groups thereof) passing through the conduit and the collar under the "cap". The insulating structure that supports and separates the wires (or groups thereof) as they exit the "head" is sometimes referenced as a "wire separator" or "wire support" and, because of its lack of electrical conductivity, as an "insulator".

A service entrance head is shaped like a hood, with the surface where the wires enter facing down at an angle of at least 45°, to shield it from precipitation. A rubberized gasket makes for a tight seal against the wires. Before they enter the service entrance head, a drip loop is left in the overhead wires, which permits rain water that collects on the wires to drip off before reaching the service entrance head. Service entrance heads are required by electrical codes or building codes. They are also commonly used on utility poles where overhead power lines enter a conduit to pass underground.

Multiple prior designs for service entrance heads exist and several are illustrated in the seven figures of FIG. 1. A major failing of the prior designs is that the collar by which the service entrance head is attached to the service conduit surrounds the conduit and requires that the service passing under the cap and through the collar and/or insulator must be severed or disconnected. Severing or disconnecting the service then requires either running a new service through the replacement/new entrance head or pulling the original service wire back through the old service so that the ends of the service become available.

In a modern urban setting, a service entrance cap installation for a previously installed service may require not just the effort of cutting/disconnecting and rewiring but also multiple visits by multiple different utilities depending on the service contained within the cap. For instance, a cap containing electrical wiring and fiber optics might require visits from an electrical utility, a cable provider, as well as a telephone provider to reinstall the severed/disconnected wiring/lines.

It is an object of the present invention to provide an improved, more efficient service entrance head that may replace a damaged or aged service entrance head for an "in place" service without requiring that the service running through the original entrance head to be severed or disconnected during the installation.

In a first embodiment, the improved service entrance head includes the service cap and the support therefor which may be sectioned and assembled to form a column surrounding the conduit.

In a second embodiment, the collar may be provided with an opening through which the service may pass so that the collar does not completely surround the conduit.

The foregoing and many other objects and advantages will be readily apparent to one of skill in this art from a perusal of the claims, the appended drawings and the following detailed description of preferred embodiments.

BRIEF DESCRIPTION OF THE DRAWINGS

FIG. 19 shows a one-piece, prior art wire insulator.

FIG. 20 shows a comparison of one embodiment of the insulator of the present invention vis-à-vis a known hybrid collar/insulator.

Figure 1:
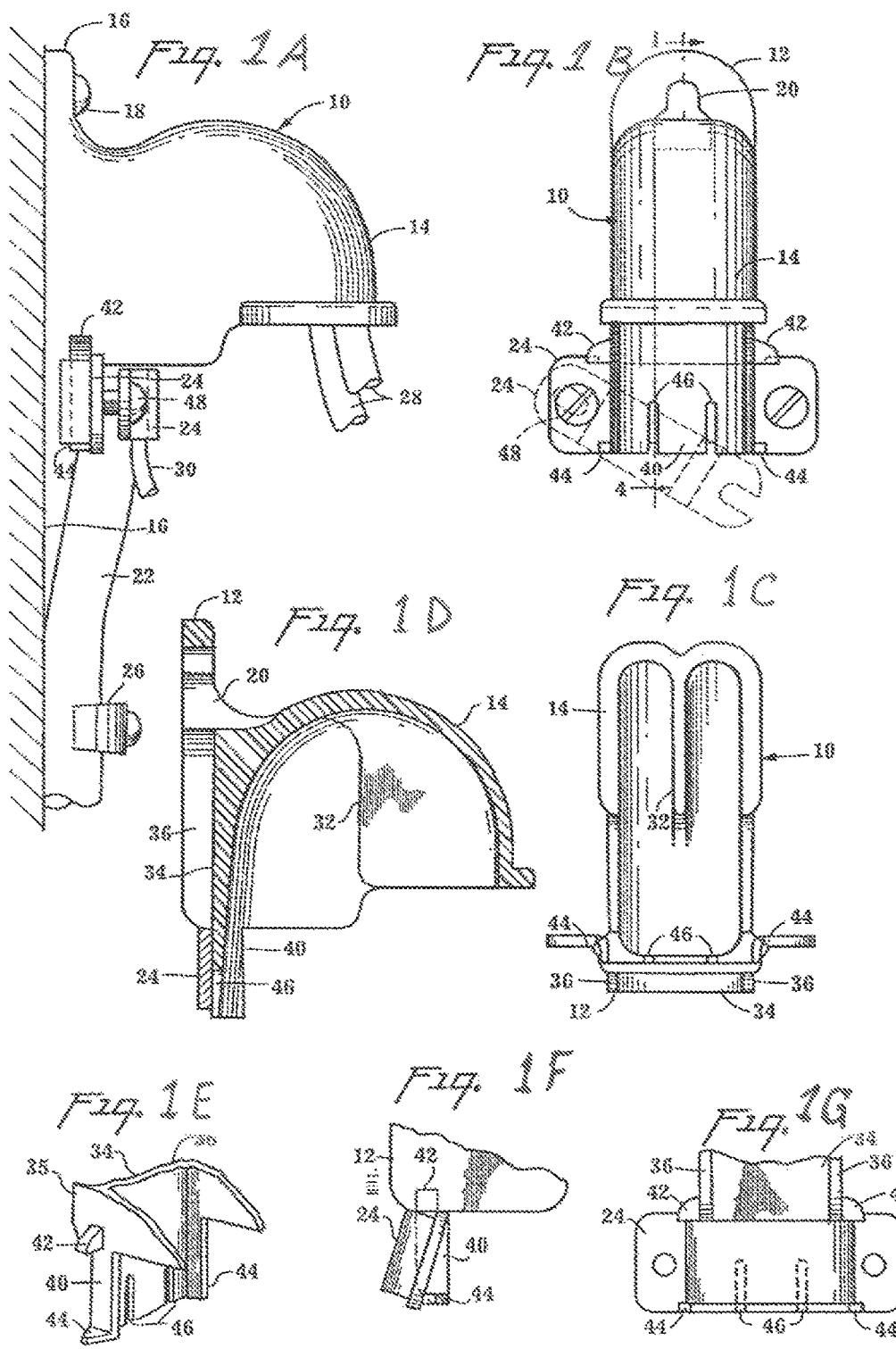
FIG. 1 shows a prior art design.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF PREFERRED EMBODIMENTS

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 2:
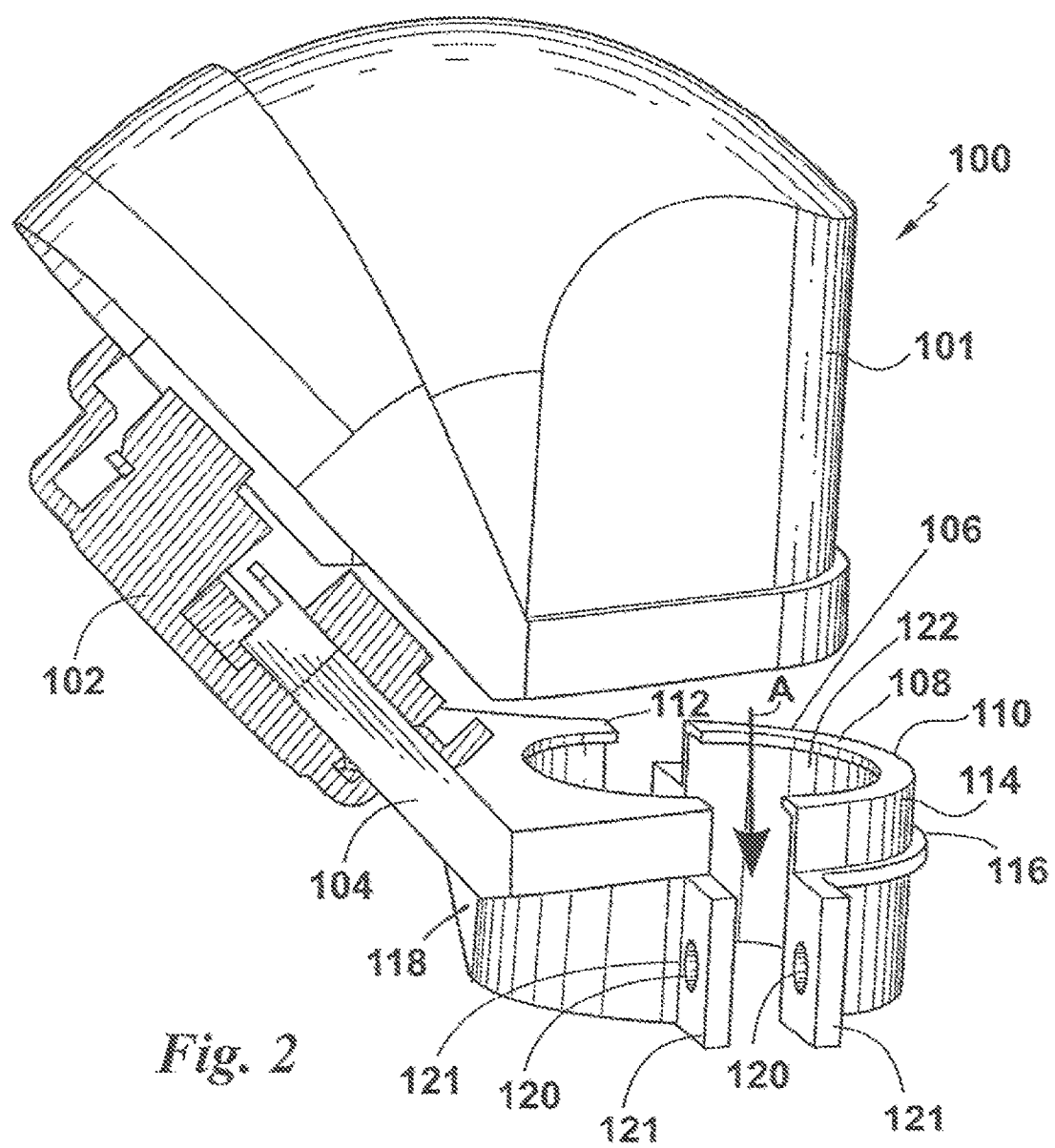
FIG. 2 shows one embodiment of one embodiment of the service entrance head of the present invention.

The current disclosure provides an improved service entrance head that allows for installation/replacement of a service entrance head without requiring that the wiring/lines within the service head be severed or disconnected as described herein. FIG. 2 illustrates one embodiment of a service entrance cap 100 of the current disclosure. Service entrance cap 100 may include an enclosing cap 101, a wire separator 102 for arranging wires entering service entrance cap 100, an insulator support 104, and a sectioned mounting collar 106. Wire separator 102 may also serve as insulation for the device of the current disclosure. Sectioned mounting collar 106 while shown as bifurcated may in other embodiments contain three, four, five or more segments to form the circumference of sectioned mounting collar 106. Further, sectioned mounting collar 106 may be formed from metals, plastics, synthetics or other materials as known to those of skill in the art. In a preferred embodiment, section collar 106 may be formed from aluminum.

In prior designs, the sectioned mounting collar of the current disclosure is a unitary piece forming a continuous, unbroken support surface. In the current disclosure, upper support surface 108 is comprised of, at least, first support surface 110 and second support surface 112, which are separable and rejoinable to one another via methods as known to those of skill in the art such as grooves, screws, bolts, non-permanent adhesives, frictional engagement, etc. Further, the collar may be hinged on one side or both to allow for rejoinability. This allows for the collar to be removed and replaced repeatedly without requiring replacement or destruction of the collar being manipulated. Further, wire receiving column is formed from, at least, first receiving section 106 and second receiving section 118. In prior art devices, the upper portion of the receiving column forms a single, continuous, unbroken lip for engagement with the lower section of the cap.

Figure 3:
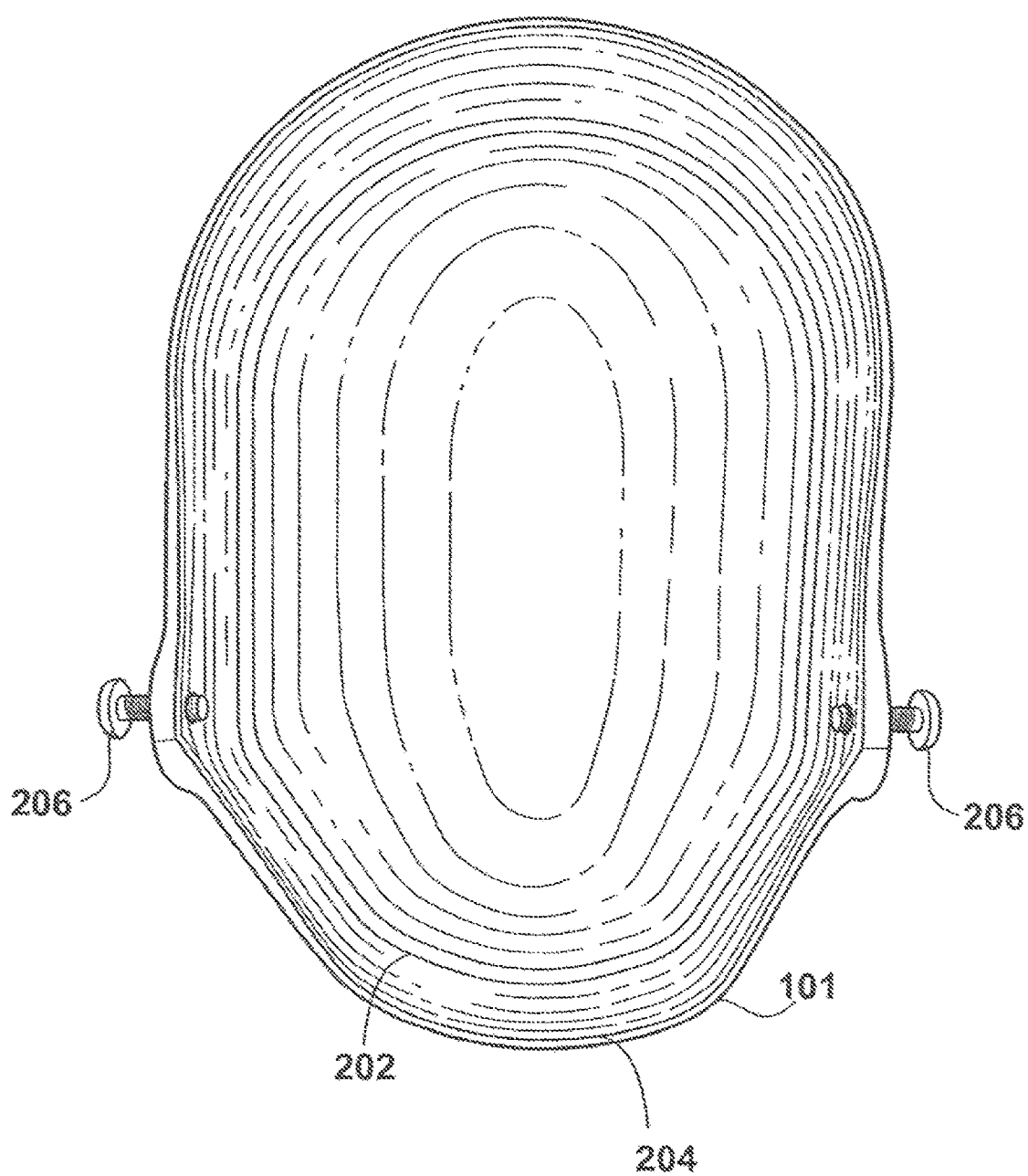
FIG. 3 shows a bottom view of one embodiment of the cap of FIG. 2.

In the current disclosure, first receiving section 106 and second receiving section 118 engage with an underside ridge 202, see FIG. 3, of enclosing cap 101. The sectioned nature of wire receiving column 106,118 does not encourage leakage as upper support surface 108 is covered by side wall 204 of enclosing cap 101 as underside ridge 202 rests upon surface 116. As shown in FIG. 3, enclosing cap 101 may engage sectioned mounting collar 106,118 via frictional engagement of tighteners 206, such as via tightening screws to engage with the outer surface of sectioned mounting collar 106,118.

Sectioned mounting collar 106,118 may define openings 120 via conjoining flanges 121 for allowing a screw or other means as known to those of skill in the art to secure first receiving section 106 and second receiving section 118 to one another or to secure addition sections, if same are present. The interior 121 of openings 120 may be threaded or otherwise formed to allow sectioned mounting collar 106 to be assembled and disassembled without requiring any change to the wiring/line contents surrounded by service entrance cap 100.

One of the key improvements of the current disclosure is that wiring, lines, or other items, represented by arrow "A" in FIG. 2, that pass through the receiving column 122, do not need to be severed and/or disconnected in order to install or replace service entrance cap 101 around the items represented by A. Indeed, by simply detaching first receiving section 106 from second receiving section 118, full access to wires/lines A is provided and a new cap may be added with minimum effort due to the reassembly of sectioned mounting collar 106, either the original or a replacement/new sectioned mounting collar 106, via tightening screws, bolts, or other affixing devices through openings 120.

Figure 4:
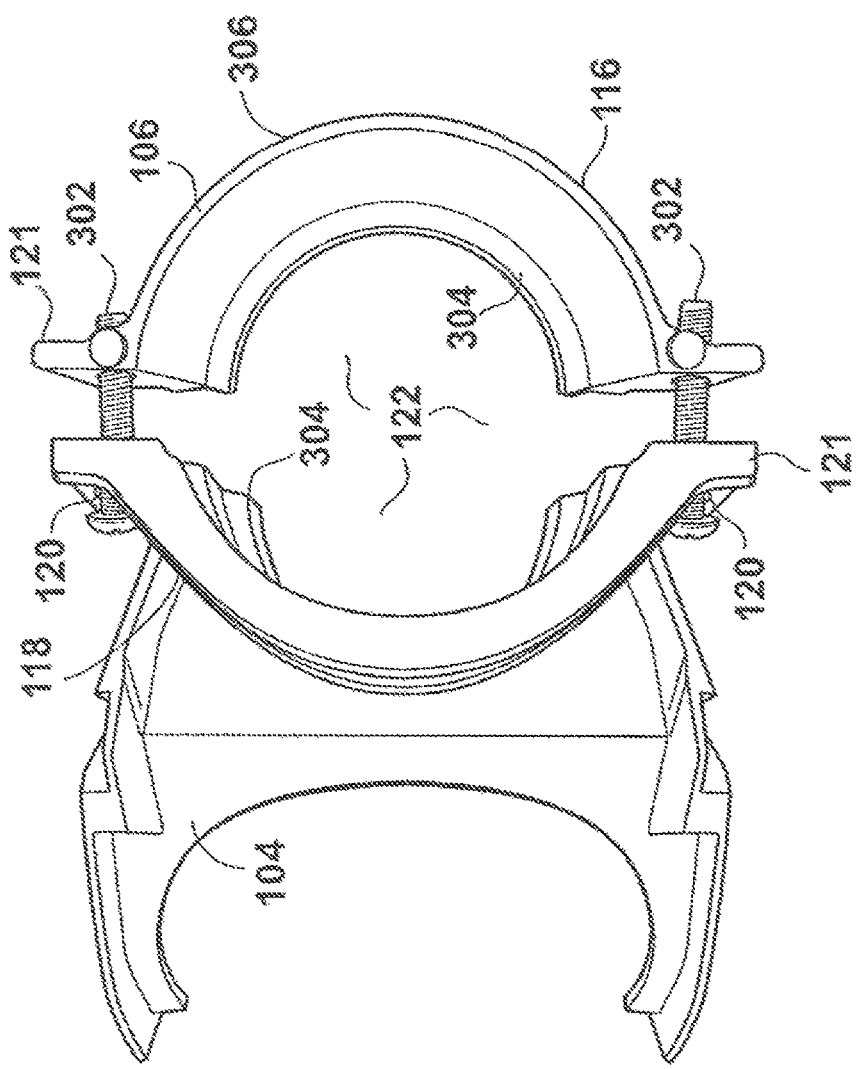
FIG. 4 shows a bottom view of one embodiment of the sectioned mounting collar of FIG. 2.

FIG. 4 shows a bottom view of one embodiment of sectioned mounting collar 106 of the current disclosure with affixing devices 302, here shown as threaded screws, partially connecting first receiving section 106 and second receiving section 118. FIG. 4 also shows inner support ledge 304 of sectioned mounting collar 106. Inner support ridge 304 runs circumferentially along the inner top section of first and second receiving sections 106 and 118. Inner support ridge 304 serves to sit atop a pipe, PVC tube, or other columnar device, not shown, which allows wiring/lines A to enter into a home, business, or other structure. Inner support ridge 304, when first and second receiving sections 106 and 118 are connected to one another via tightening of screws 120, also serves to prevent water from entering and flowing down column interior 122 by engaging and overlapping the columnar support and forming yet another barrier against entry into column interior 122. Further, sectioned mounting collar 106,118 may also be designed to have an adjustable circumference by forming additional segments from collar wall 306 and securing same with screws 302 via additional holes 120 and conjoining flanges 121, such as three, four, five, or more segments, thus, the disclosure should not be considered limited to just two segments of collar wall 306 nor to a static circumference.

Figure 5:
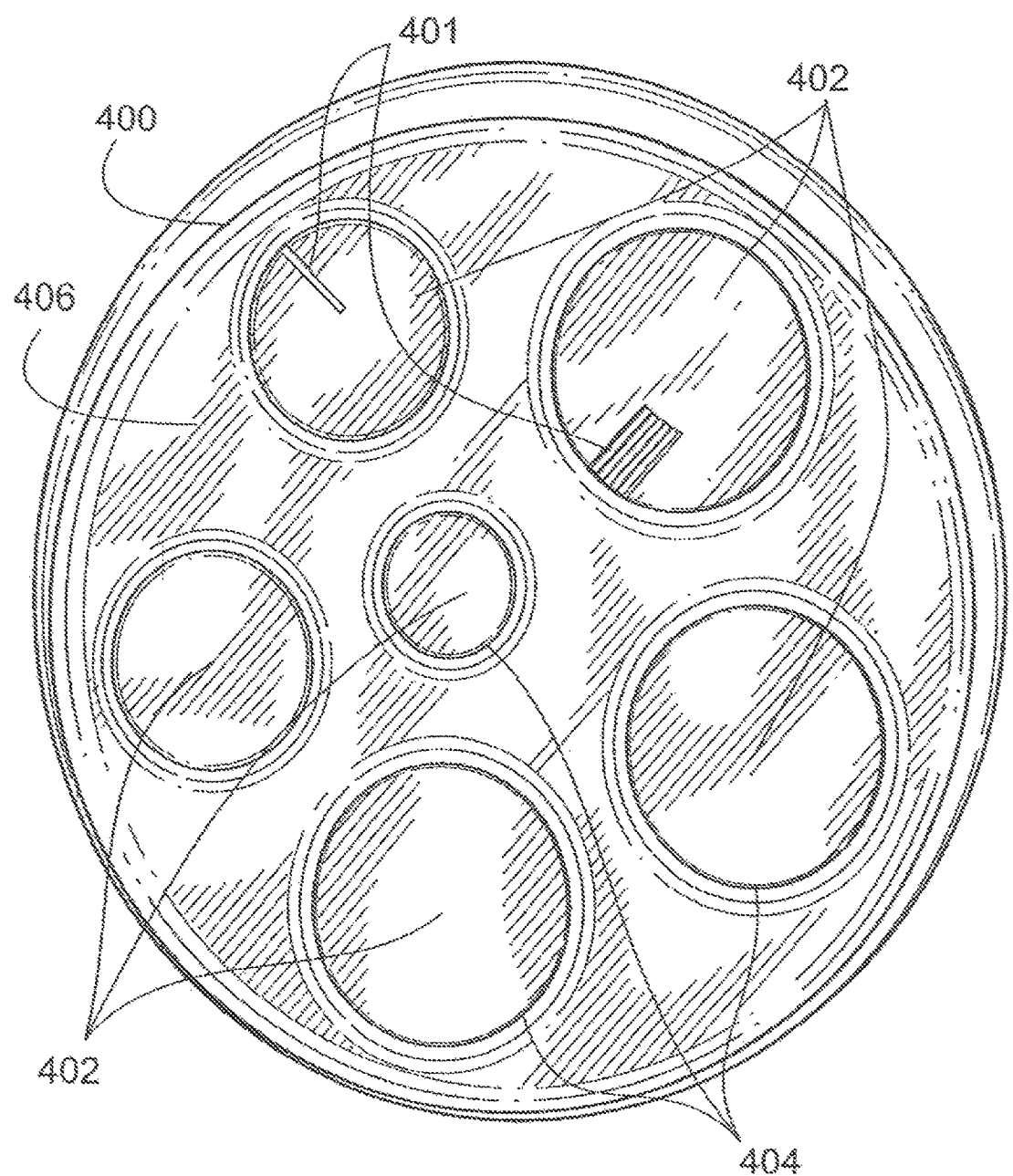
FIG. 5 shows the insulator of FIG. 2.
Figure 6:
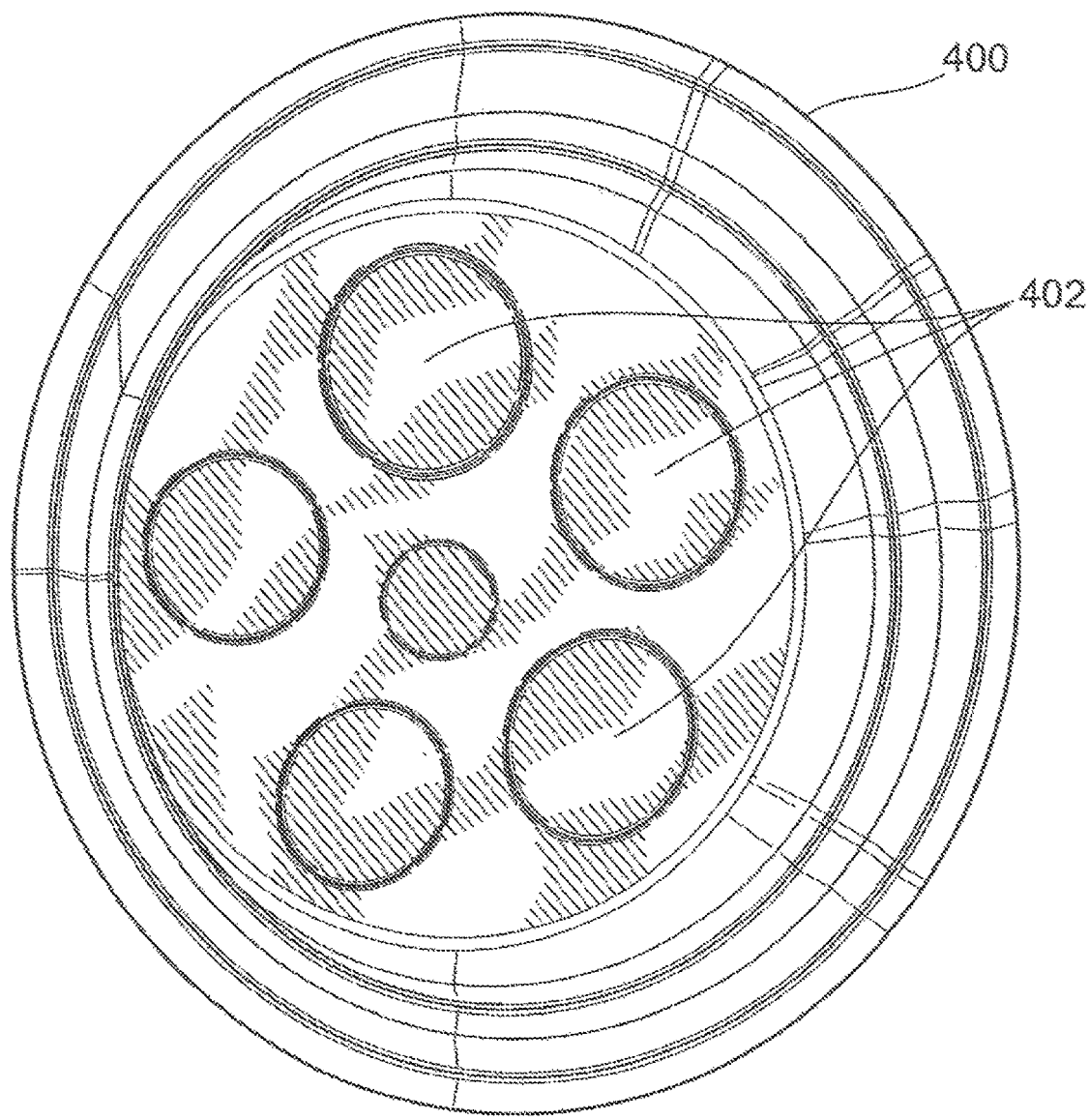
FIG. 6 shows a bottom view of the insulator of FIG. 5.

FIGS. 5 and 6 show one embodiment of a wire separator insulator 400 that may be used with the current disclosure. Wire separator insulator 400 may also define openings via removable sections 402 to accommodate different sized wiring/lines into service entrance cap 100 via creating narrow openings to admit the wiring/lines while keeping the remainder of the separator insulator solid and sealed against the elements. The narrow openings may be formed via removing or "popping out" removable sections 402, which may be created by forming a weakened border 404 in wire separator insulator surface 406. While removable sections 402 are shown as circular or substantially circle, any shape may be employed for the openings such as polygons, ellipses, irregular shapes, designs such as stars, figures, etc. Further, separator insulator 400 may define slots 401 in removable sections 402 that will be removed instead of removing the entirety of removable section 402 by specifically shaping or designing weakened border 404 to leave any desired shape behind once removable section 402 is removed. Wired separator insulator may be formed from plastics, synthetics, nonwovens, ceramics, etc., as known to those of skill in the art. In a preferred embodiment, plastic may be employed such as HWPE.

Figure 7:
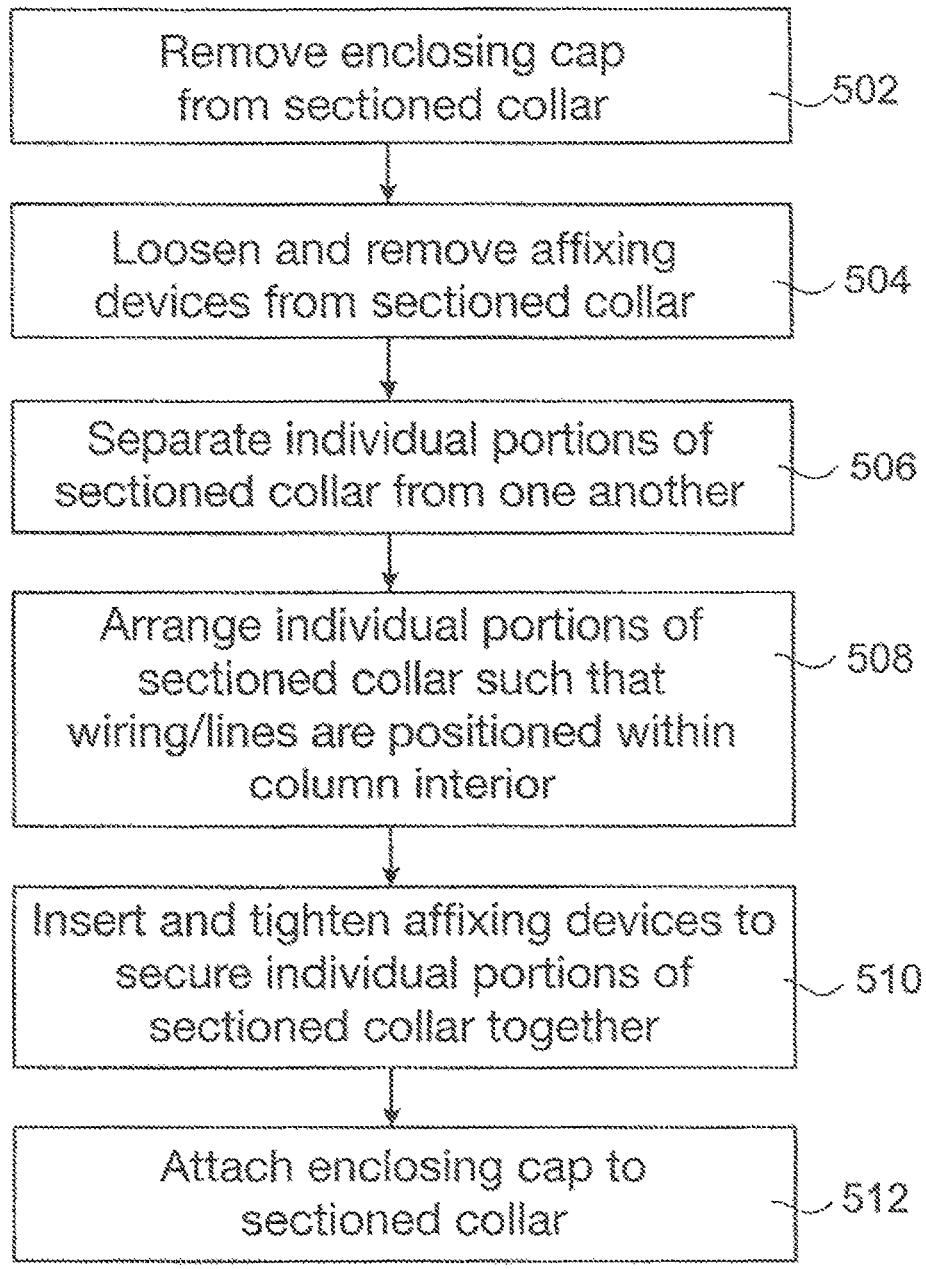
FIG. 7 shows a schematic of an installation method of the embodiment of FIG. 2.

In a further embodiment, see FIG. 7, method 500 may be provided for installing or replacing a service entrance cap without severing or otherwise disconnecting wires contained within original service entrance cap 100 or wires that have been previously installed but wherein no service entrance cap is in place. At step 502, one removes the enclosing cap from the segmented collar, however, this step may be omitted if no cap is present, this may be done by loosening screws or other fixtures that secure the enclosing cap to the sectioned mounting collar. At step 504, one loosens and removes the affixing devices from the sectioned mounting collar. At step 506, one separates individual portions of the sectioned mounting collar from one another. At step 508, one arranges the individual portions of the sectioned mounting collar such that the wiring/lines are positioned within the column interior of the sectioned mounting collar. At step 510, one inserts and tightens the affixing devices to secure individual portions of the sectioned mounting collar together, thereby securing the wiring/lines within the sectioned mounting collar in the column interior. At step 512, one finalizes the installation/replacement by attaching the enclosing cap to the sectioned mounting collar. In a further embodiment, the current disclosure may provide a kit for installation of a service entrance cap. The kit may include a sectioned mounting collar 106,118 an enclosing cap 101 and a wire separator insulator 400.

Figure 8:
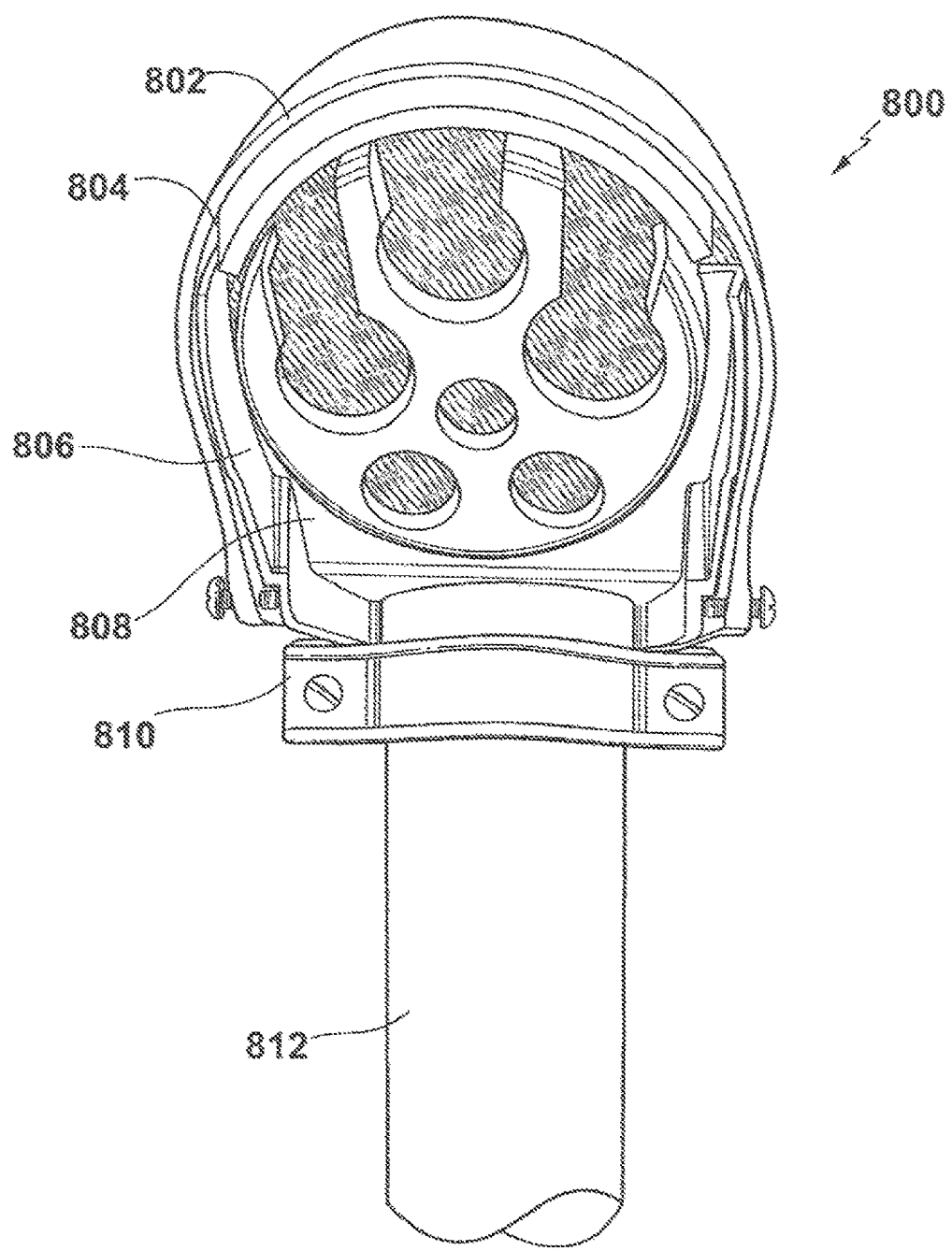
FIG. 8 shows a second embodiment of the service entrance head of the present invention.

FIG. 8 shows a further embodiment of an improved service entrance cap support 800. FIG. 8 shows an assembled view of improved service entrance cap support 800. In this embodiment, a solid entrance cap 802 may cover a multi-piece separator 804 which rests within holding or support ridge 806 of insulator support ledge 808 which forms part of detachable conduit collar 810, which may be a sectioned mounting collar as shown in FIG. 4, which at least substantially, if not completely, encircles conduit 812. Solid entrance cap may be made of plastics, synthetics, metals, nonwovens, or other materials as known to those of skill in the art. In a preferred embodiment, solid entrance cap 802 may be formed from metal and/or plastic. Multi-piece separator 804 may be made from polyethylene, cross-linked polyethylene (either through electron beam processing or chemical crosslinking), rigid laminate, varnish, resin, PVC, Kapton, Cresyl Pthalate, DEHP, rubber-like polymers, oil impregnated paper, Teflon, silicone, or modified ethylene tetrafluoroethylene (ETFE), Bakelite®, compressed inorganic powder, glass, plastic, rubber, mica, perfluoroalkoxy, etc., as known to those of skill in the art. Support ridge 806 may be placed or tilted at an angle to conduit collar 810 such as 5, 10, 15, 20, 25, 30, 35, 40, 45, 50, 60, 65, 70, 75, 80, 85, or 90 degrees. In one embodiment, support ridge 806 may be positioned between 20-90 degrees to conduit collar 810 and in a further embodiment, may be positioned at approximately 45 degrees with respect to the plane running parallel to the top of conduit collar 810.

Figure 9:
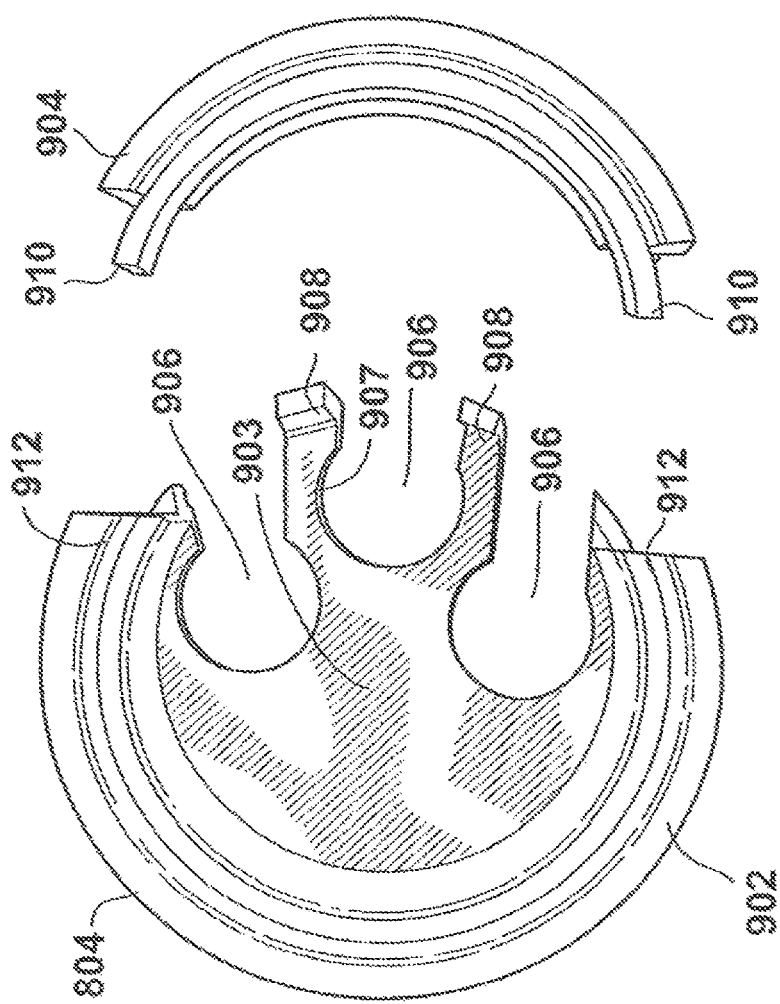
FIG. 9 shows a multi-piece insulator separated into component parts.
Figure 14:
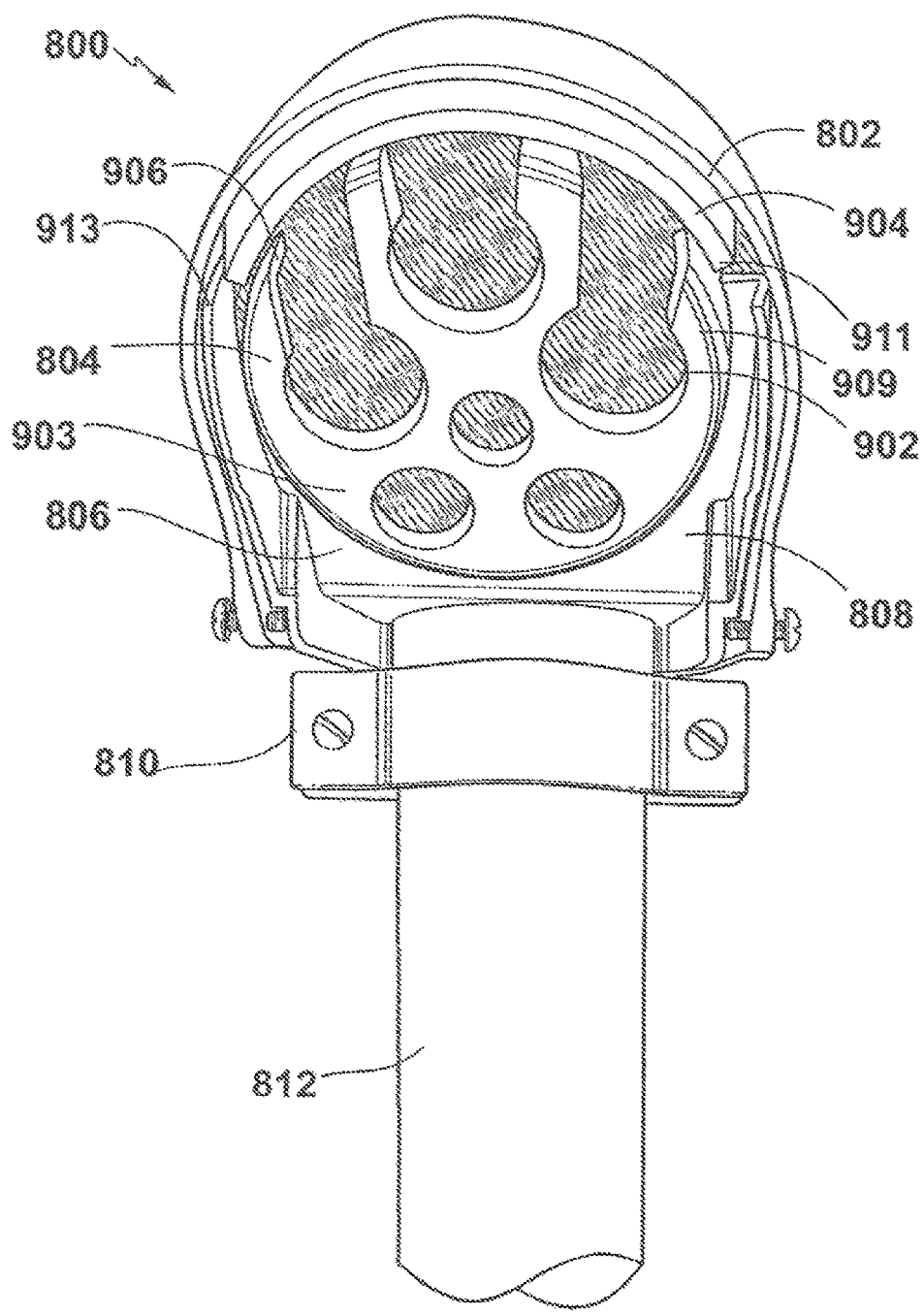
FIG. 14 shows an underneath view of FIG. 13.

FIG. 9 shows a multi-piece separator 804 separated into component parts wire support 902 and enclosing brace 904. Wire support 902 may define openings 906 formed by creating frangible breaks 907 around a perimeter of openings 906 so that a user may simply press or otherwise use force to create openings 906 by removing a seal piece, not shown, and leaving separator arms 908 intact and extending outward from wire support body 903. Enclosing brace 904 may frictionally engage wire support 902 via engaging arms 910. While two arms are shown, less or more arms are herein disclosed. For instance, a single arm may be employed or enclosing brace 904 may be configured to possess 3, 4, 5, 6, or more engaging arms. Engaging arms 910 may frictionally engage with inner circumference 912 of wire support 902 to secure the two together. Further, engaging arms 910 may be formed to engage with wire support 902 through male/female engagement, mating surface attachment or other means as known to those of skill in the art. In a further embodiment, wire support 902 and enclosing brace 904 may join via grooves placed in wire support 902 to accommodate and/or receive engaging arms 910. Other ways of joining may include hinging one side of the wire support 902 to enclosing brace 904. Further, wire support and enclosing brace 904 may be formed to possess locking engagement wherein engaging arms 910 may be locked into place with wire support 902 such as via anchors, prongs, adhesives, etc., that would allow the pieces to be joined and then not separated without having to deform or break wire support 902 and/or enclosing brace 904. This may be employed for security purposes or to ascertain if access has been gained to a service head. Also, while engaging arms 910 may be formed on enclosing brace 904, they may also be formed on wire support 902 and then engage enclosing brace 904 as discussed supra with respect to wire support 902. Further, enclosing brace 904 may serve as insulation between the wires engaged within wire support 902 and entrance cap 802 as well as be designed, as shown in FIG. 14, to overlap circumference 909 of wire support 902 via strengthening ridge 911. The ridge 911 prevents rotation of wire support 902 and enclosing brace 904 via contact with support ridge 806 at support ridge edge 913.

Figure 10:
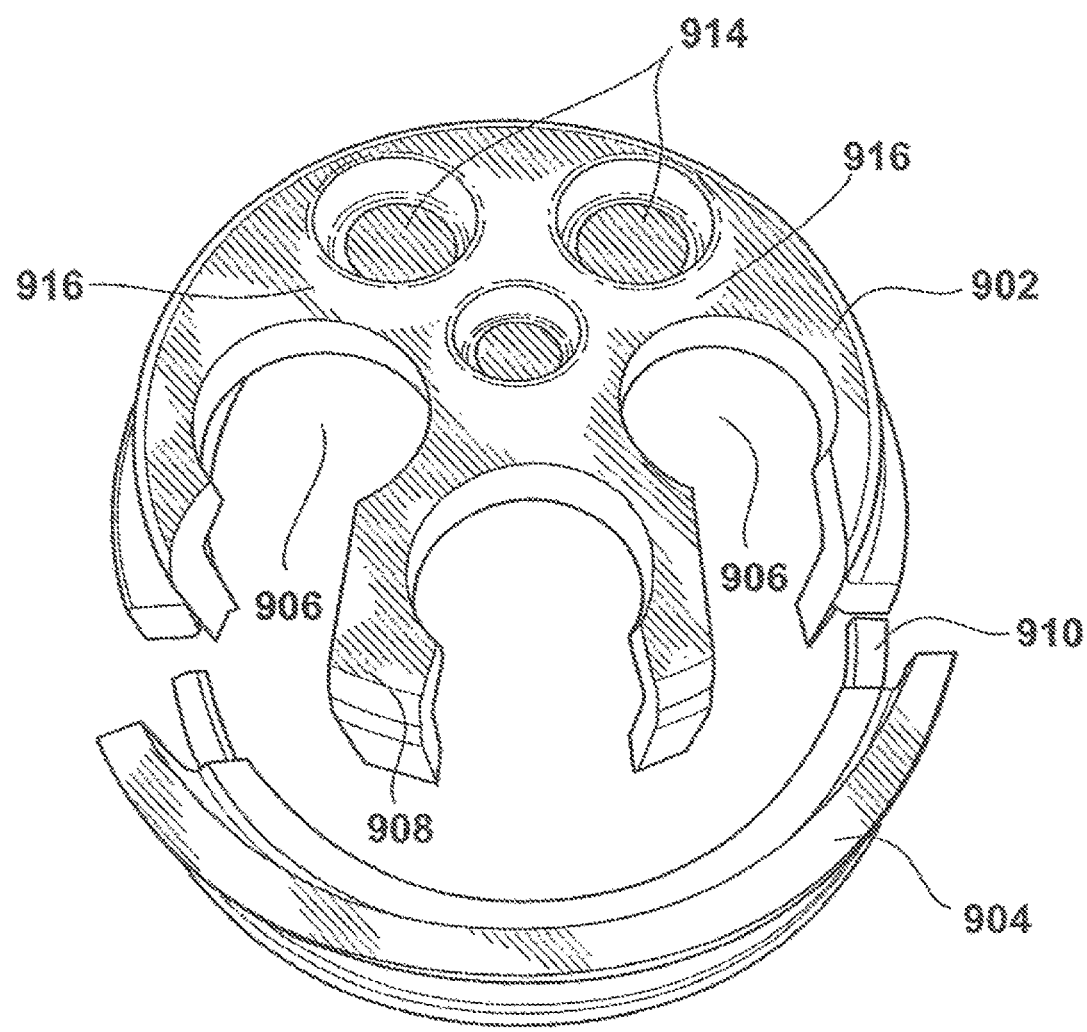
FIG. 10 shows a top view of multi-piece insulator of FIG. 9 with some frangible pieces intact.

FIG. 10 shows a top down view of multi-piece separator 804 with some frangible seal pieces 914 left intact. The frangible seal pieces may be removable sections that a user may remove from the wire support body to form cavities or openings in the multi-piece separator 804. Further, divider walls 916 may also be formed to be removable, such as via frangible sections, cutting, etc., so that additional openings 906 may be formed within wire support body 903.

Figure 11:
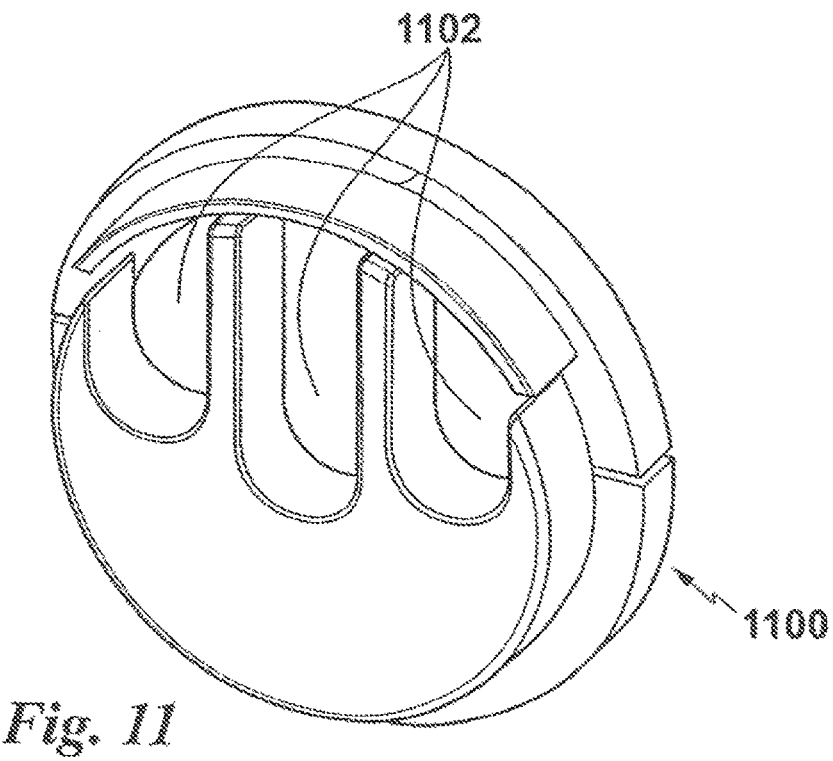
FIG. 11 shows an alternative embodiment of a multi-piece insulator where there are no frangible spaces, only slots formed in the separator.
Figure 12:
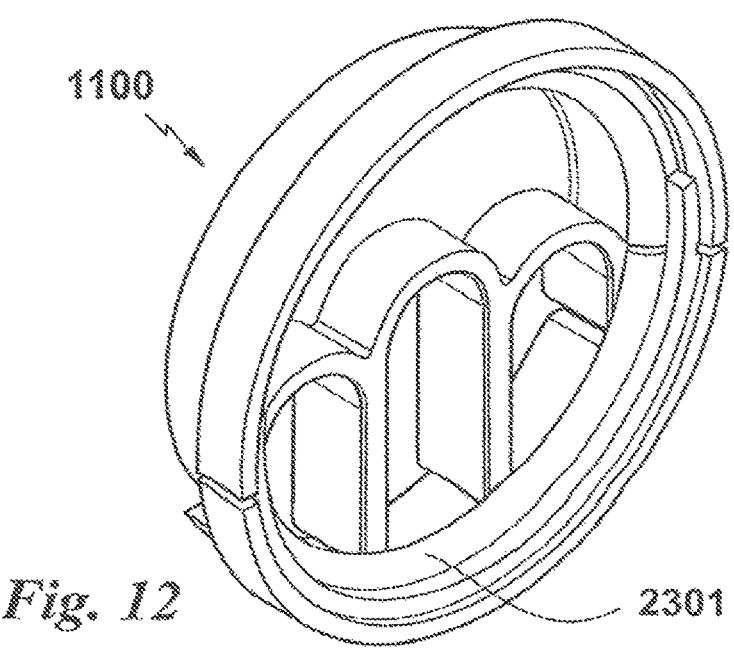
FIG. 12 shows a rear view of FIG. 11.
Figure 22A:
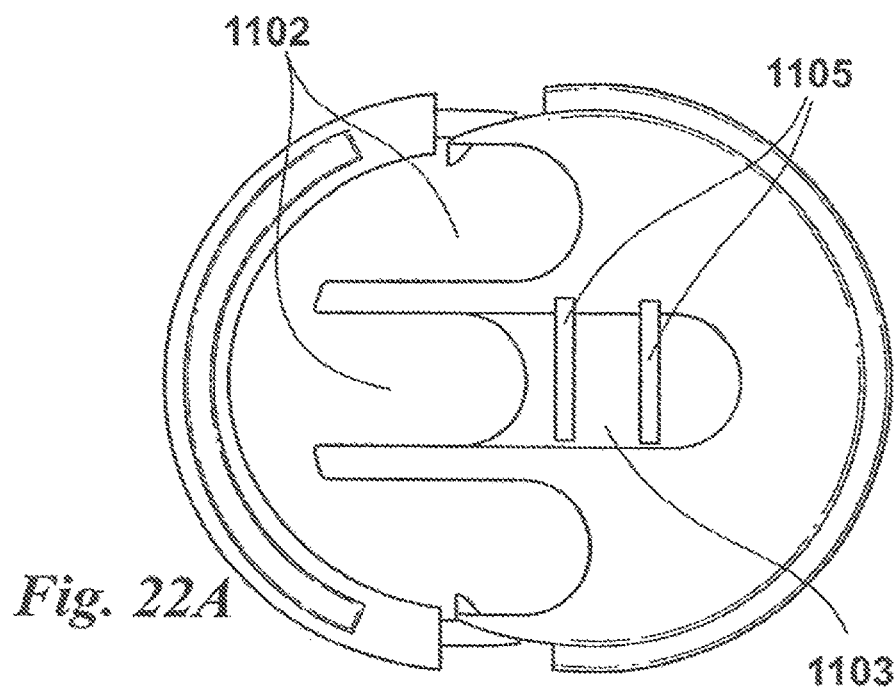
FIG. 22A shows an alternative embodiment, wherein slots may be "deepened" or "lengthened" via snapping out frangible section(s) to create a preferred slot size.

FIG. 11 shows an alternative embodiment 1100 of another multi-piece separator wherein there are no frangible sections to remove, only slots 1102, that allow for insertion of wires, cabling, etc., into slots 1102. FIG. 12 shows a rear view of FIG. 11. With respect to slots 1102, these may be of varying lengths/depths with respect to one another, all the same length, all with different lengths. The lengths/depths may be determined based on the use for the service head as well as the wire/cabling/etc., being protected. FIG. 22A shows an alternative embodiment, wherein slots 1102 may be "deepened" or "lengthened" via snapping out frangible section(s) 1103 in order to create a preferred slot size. FIG. 22A shows the right and left slots 1102 with all frangible sections 1103 removed whereas the middle slot 1103 has remaining frangible section(s) 1103 remaining, which may be further removed via snapping or otherwise disengaging perforation line 1105. Multiple perforation lines 1105 may be defined within the entirety of the length of frangible section(s) 1103 in order to allow a user to select a precise or desired depth or length to the slots via removing the desired frangible sections 1103 at perforation lines 1105. Perforations lines 1105 may be of any preferred shape, such as straight, curved, angular, etc., in order to accommodate whatever wiring, cabling, etc., is being fed through the device.

Figure 22B:
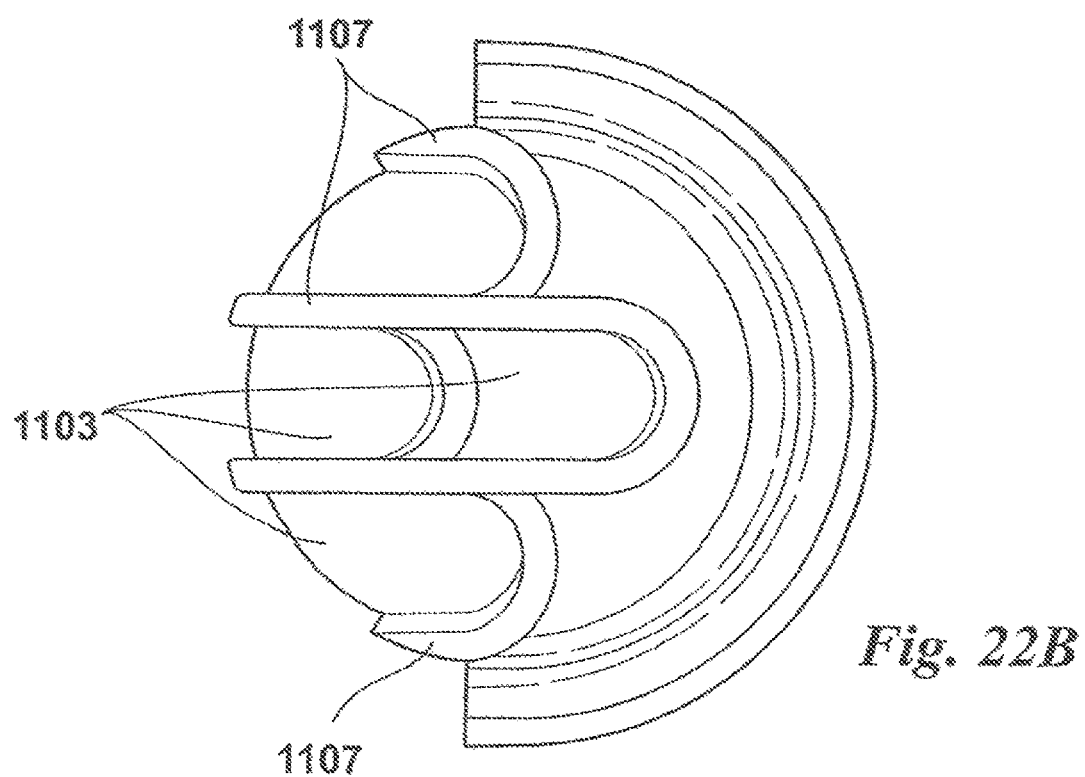
FIG. 22B shows a back view of FIG. 22A with the frangible sections in place and showing structural supports that strengthen the insulator.

FIG. 22B shows a wire separator with frangible sections 1103 in place. Further, FIG. 22B shows support/insulation structures 1107 these may be raised ridges or walls that serve to keep the insulator structurally sound and help add stability and strength to the multi-piece separator and helps further encapsulate wiring, cabling, etc., contained within the wire separator. In the field, wiring or cabling may be very heavy and cumbersome to place in the wire separator requesting the user to exert significant force to bend, contort or otherwise shape the cabling/wiring to fit within the wire separator. Element 1107 helps provide strength to the wire separator and prevents the cabling/wiring from breaking or damaging same during installation of the cabling/wiring into the wire separator.

Figure 23A:
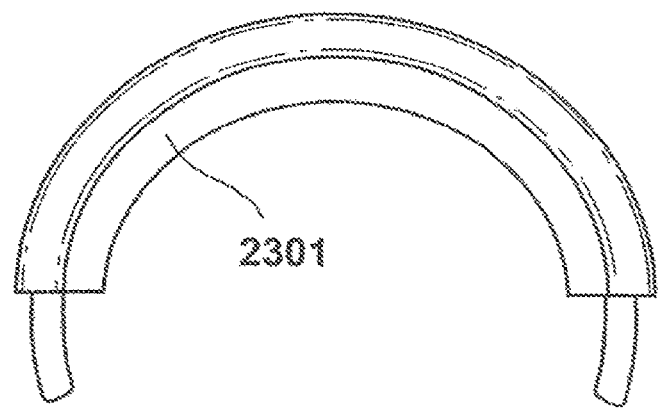
FIG. 23A shows a downward, internal view of an enclosing brace showing an internal support ledge.
Figure 23B:
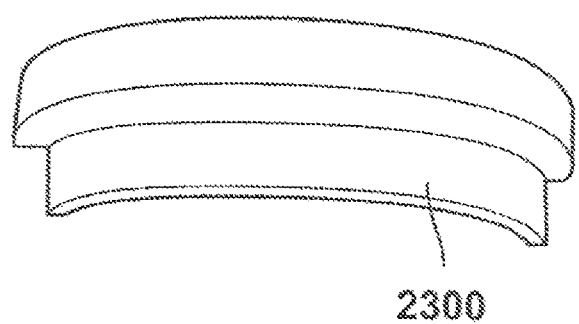
FIG. 23B shows a downward view of an enclosing brace which shows a retention ring.

FIG. 23A shows a downward, internal view of enclosing brace 904 showing internal support ledge 2301, which helps support wire separator 902 and further ensure a tight fit between the pieces. FIG. 23B shows a downward view of enclosing brace 904 which shows retention ring 2300 that fits into and helps secure multi-piece wire separator 804 into service cap 802 via frictional engagement.

Figure 13:
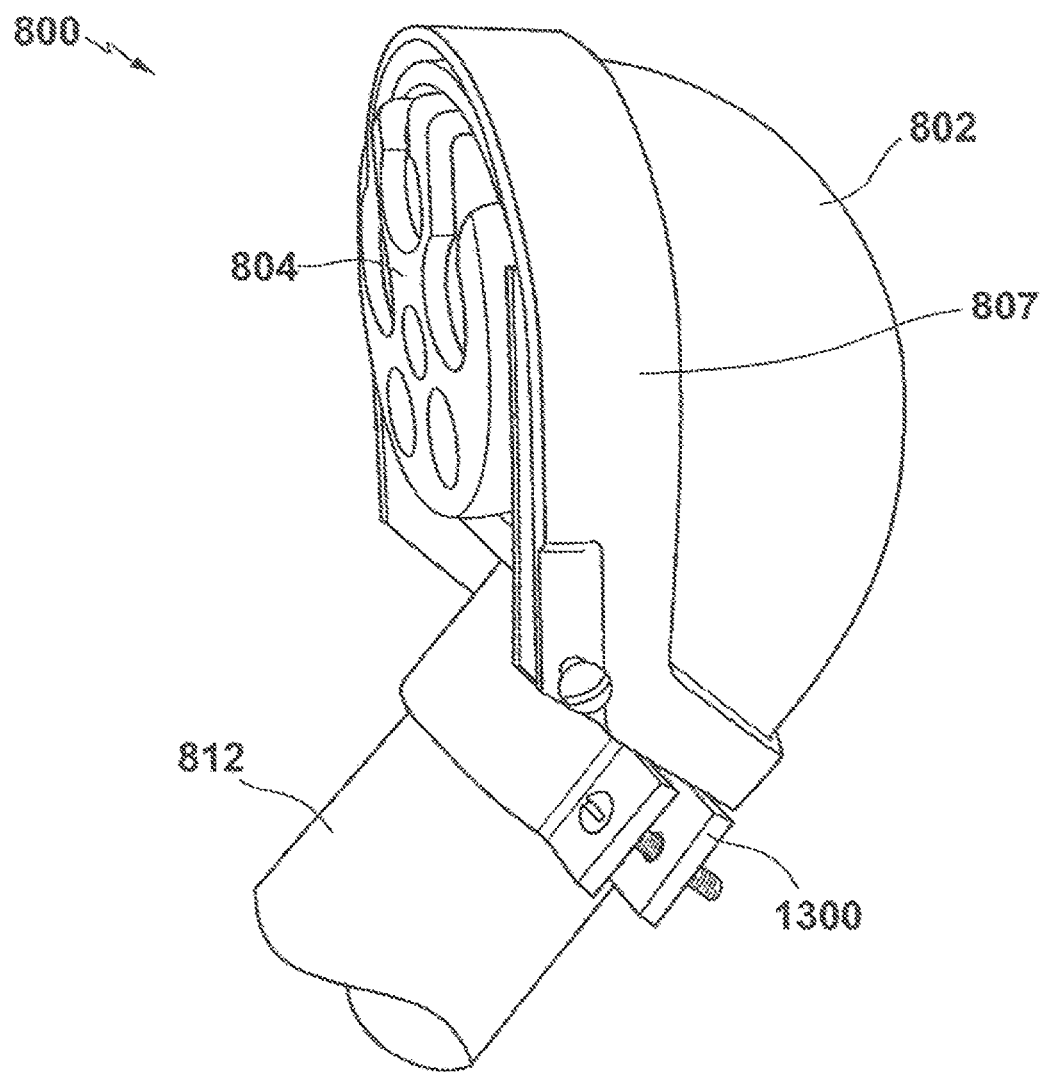
FIG. 13 shows a side view of one embodiment of the service entrance head of the current disclosure.
Figure 15:
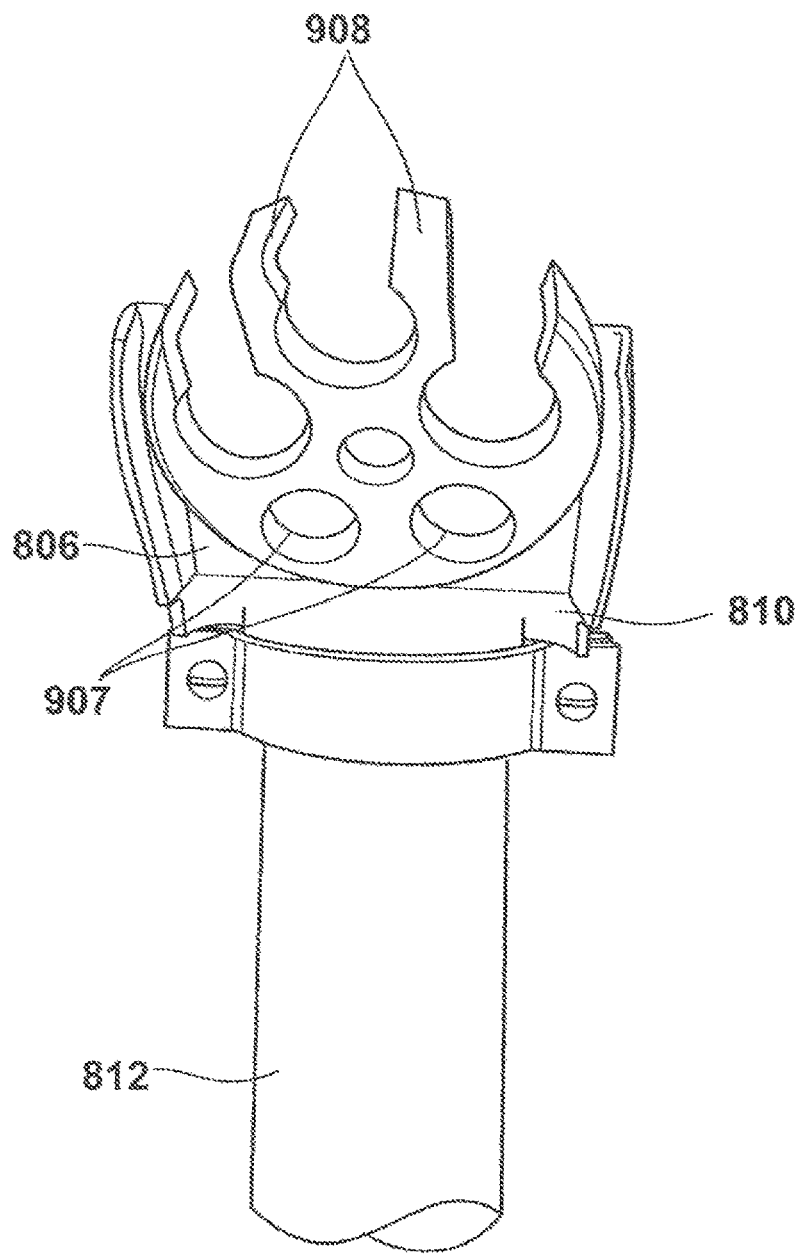
FIG. 15 shows a partially disassembled view of FIG. 13.
Figure 16:
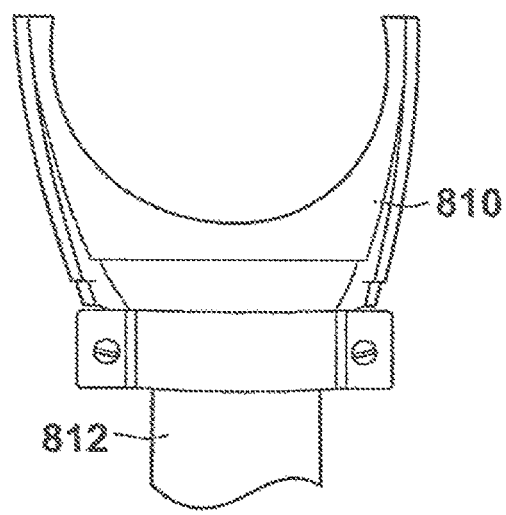
FIG. 16 shows a further disassembled view of FIG. 13.
Figure 17:
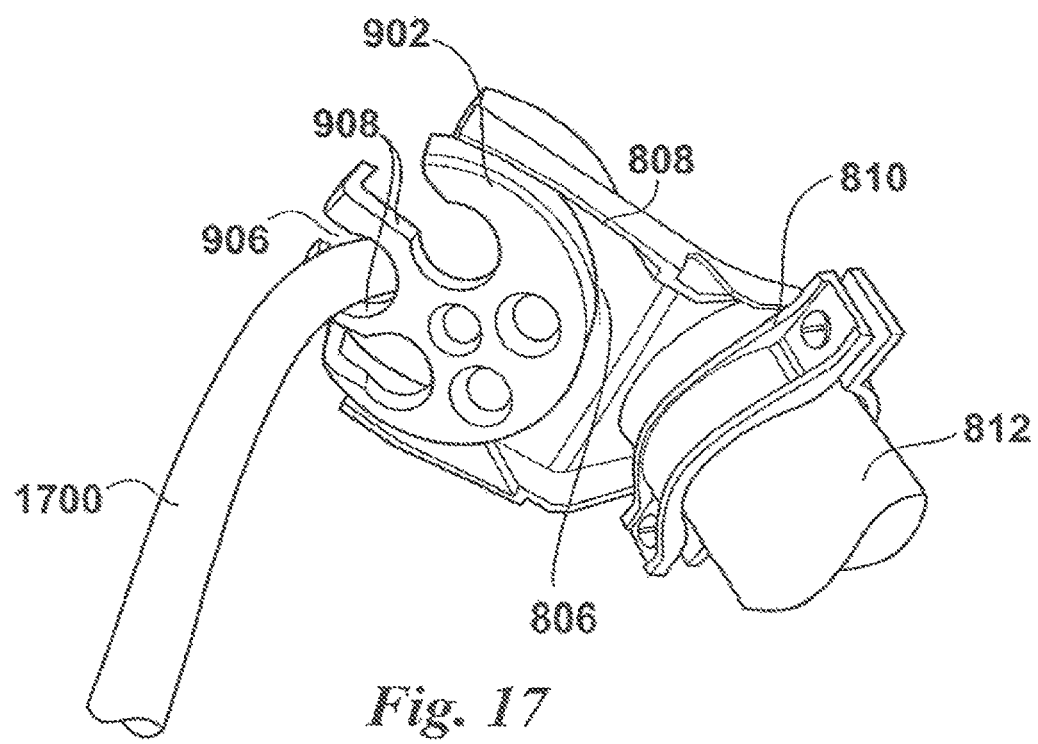
FIG. 17 shows a cable running through an opening and between separator arms in a multi-piece separator and running into conduit.
Figure 18:
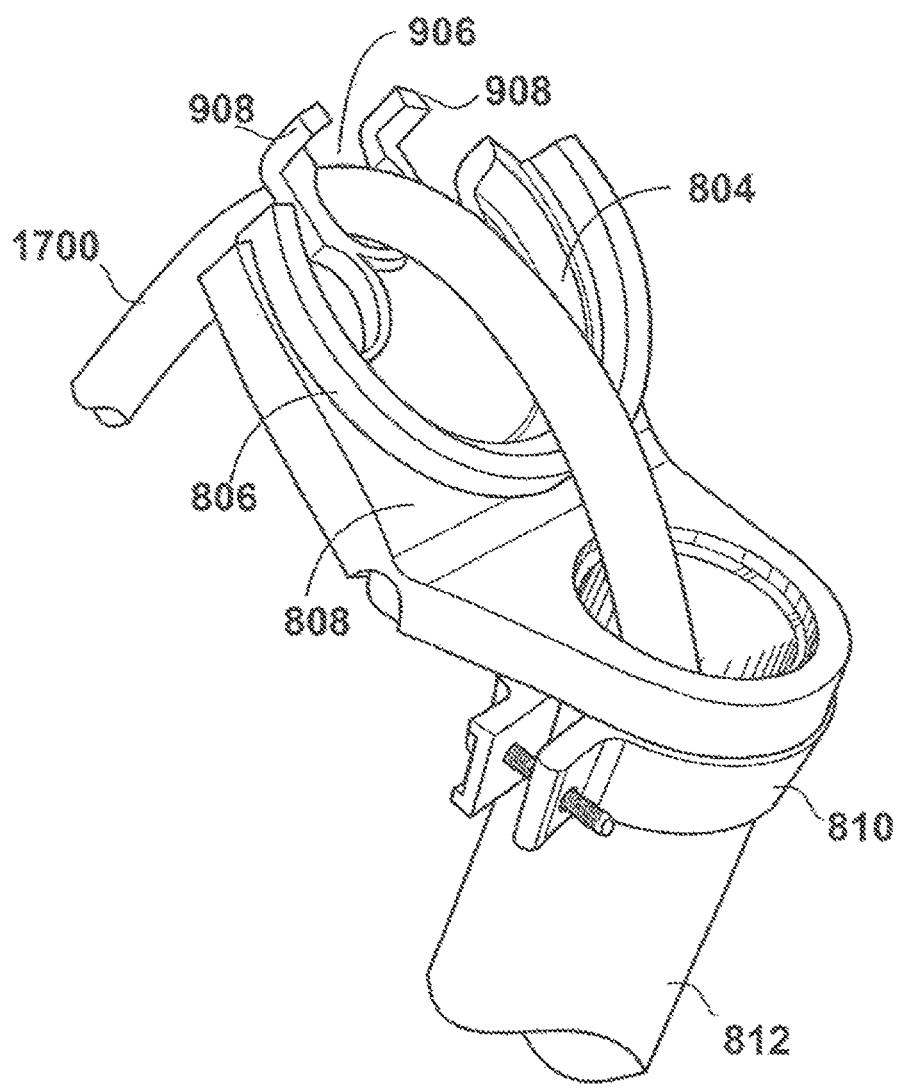
FIG. 18 shows an alternate view of FIG. 17.

FIG. 13 shows a side view of an assembled view of an improved service cap 800 of the current disclosure with a further embodiment of sectioned mounting collar 810 comprised of polymers as opposed to a metal. In further embodiments, sectioned mounting collar 810 may be 3-D printed for time and cost efficiency. Additionally, cap 800 may define ridge 807 which surrounds and engages over multi-piece separator 804 and support ledge 808 to secure same together as well as prevent movement and/or rotation of both. Ridge 807 may be designed to match the "height" of multi-piece separator 804 and/or support ledge 808. FIG. 14 shows an underneath view of FIG. 13. FIG. 15 shows a partially disassembled view of FIG. 13 wherein solid entrance cap 802 and enclosing brace 904 have been removed. FIG. 16 shows a further disassembled view of FIG. 13. FIG. 17 shows a cable 1700 running through opening 906 between separator arms 908 in multi-piece separator 804, engaged with wire support 902 and running into conduit 812. FIG. 18 shows an alternate view of FIG. 17.

While conduit 812 is shown as round, the current disclosure is not so limited. Sectioned mounting collar 810 may be formed to fit over pipe nipples, square pipe, irregularly shaped pipe, hoses, tubing, etc., and is not limited to simply a round shape as it may be angular, round, or irregularly shaped to fit over the desired mounting surface. This disclosure essentially protects any hollow opening containing internal wiring, tubing, cabling, etc.

FIG. 19 shows a one-piece, prior art wire separator 1702 of the prior art and illustrates the need for the improved service entrance cap of the present invention. There is no way to thread a "live" cable 1700 (i.e., a cable connected at both ends) through either the collar prior or the insulator 1702. There would be no way to install either the prior art collar or the prior art wire separator without cutting the live cable 1700.

FIG. 20 shows in the left side figure one embodiment of wire support 902 of the present invention compared with a prior art hybrid support 2000/insulator 1702 in the right side figure. Note that there is no access to the lower apertures or to the interior of the collar in the hybrid device.

Figure 21:
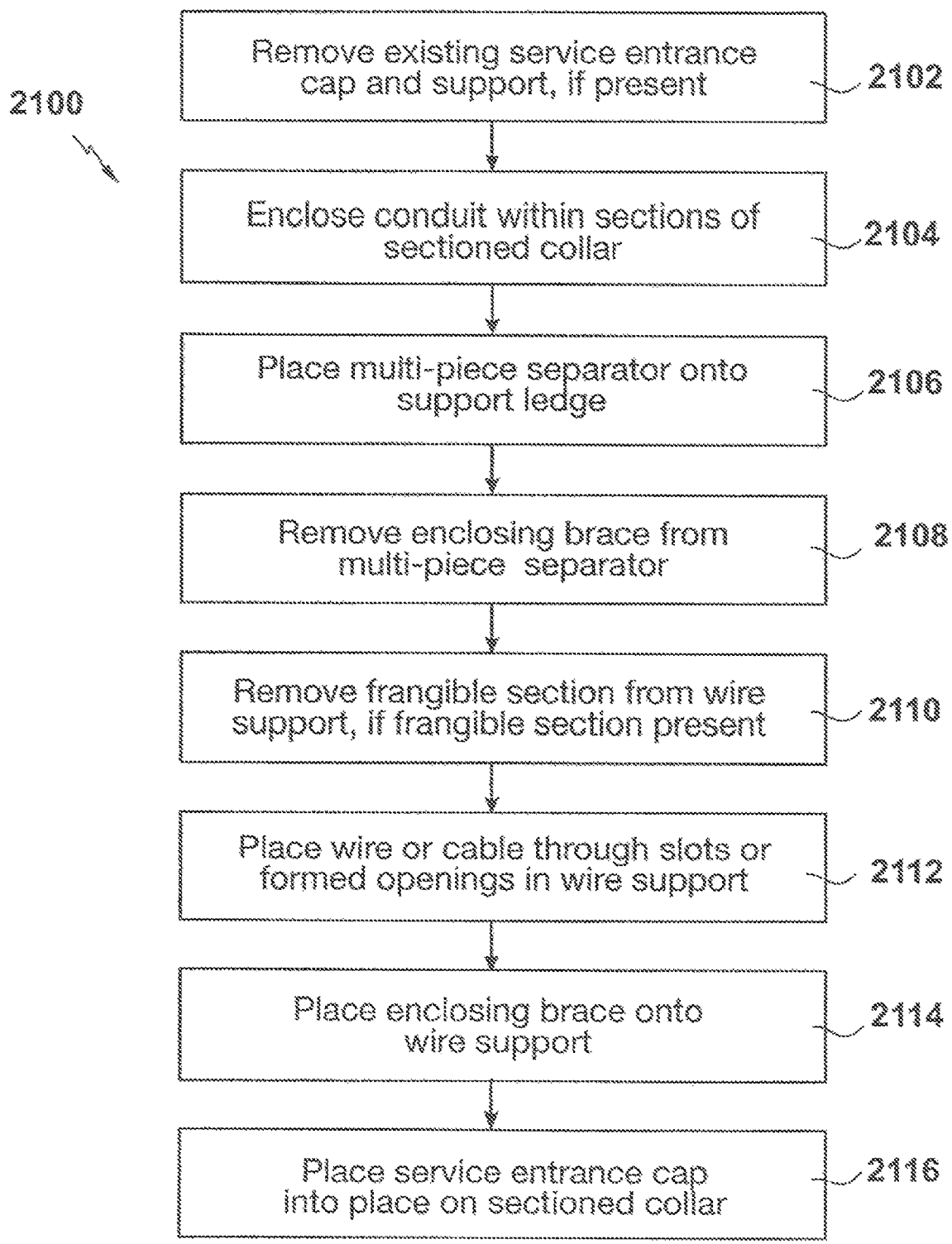
FIG. 21 shows a method of replacing an existing service entrance head with a service entrance head of the present invention.

FIG. 21 shows a method 2100 of replacing an existing service entrance cap with a service entrance cap support of the current disclosure. At step 2102, one may remove the existing service entrance cap and service entrance cap support, if present. At step 2104, one encloses an upper portion of a conduit within the sections forming the sectioned mounting collar so that the conduit is at least partially enclosed by the sections, if not completely enclosed. At step 2106, the multi-piece separator is placed onto a support ledge. This may be accomplished by either placing just a wire separator onto the ledge or placing the wire separator and enclosing brace conjoined to one another onto the ledge. If the conjoined wire separator and enclosing brace are placed onto the ledge, at step 2108 the enclosing brace is removed from the multi-piece separator. If the wire support possesses frangible sections, these may be removed at step 2110. If instead, the wire separator possesses slots, as described herein, this step may be omitted. At step 2112, wire, cable, or other cable or wire like constructs may be placed in the openings defined by the frangible sections or the slots in the wire separator. Individual wires may be placed in individual slots or openings to keep them separator from one another. At step 2114, once all cable or wiring is placed into the slots or openings, the enclosing brace is placed, if not originally removed, or reengaged with the wire support to secure the wires or cabling with the body of multi-piece separator. At step 2116, a service entrance cap may be placed on the sectioned mounting collar and secured to complete the installation. As explained herein, the current service entrance cap support via its separable collar and multi-piece separator allows for replacement of an existing service entrance cap, or replacement of a damaged one, or for addition of additional wire or cabling into a building without having to sever the wire or cabling entering the building as is currently the practice. The present invention greatly increases efficiency and reduces the time needed for running new cable or replacing existing service entrance heads.

Figure 24:
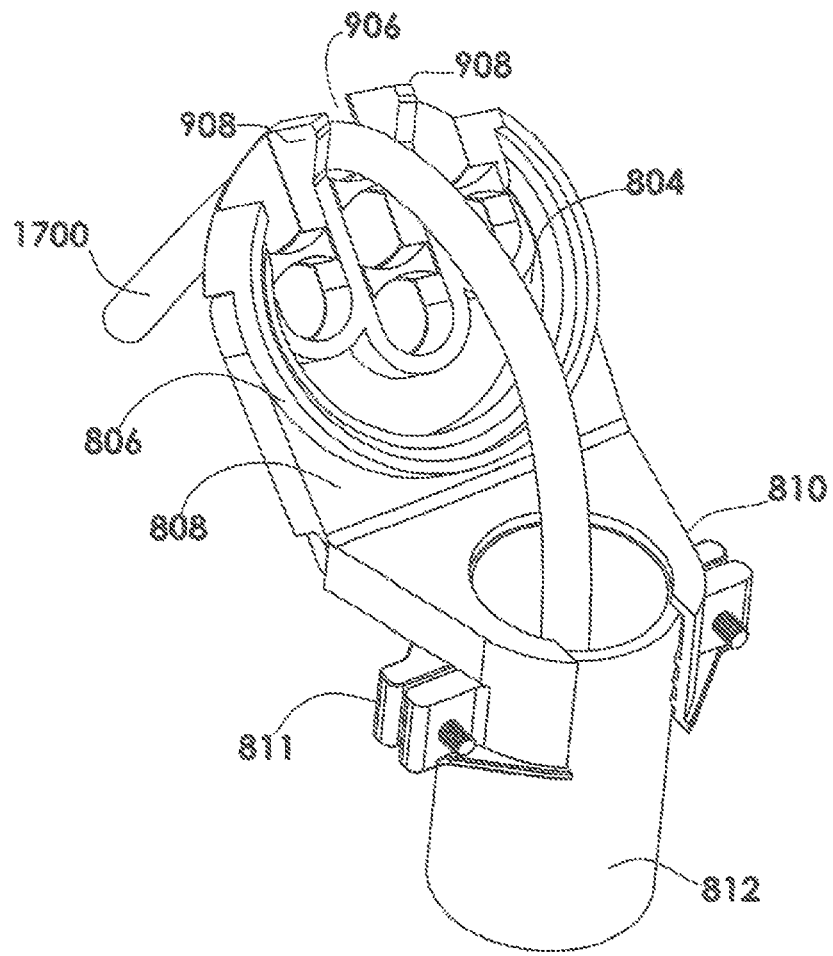
FIG. 24 shows a second embodiment of the collar by which the service entrance head may be attached to a service conduit.

A second embodiment is illustrated in FIG. 24 where the collar 810 does not completely surround the conduit 812, but is interrupted at the rear thereof to provide an opening through which the service may be introduced, it being necessary only that (a) the collar extend sufficiently to the rear to provide an opposing force to the clamp 811 which secures the collar to the conduit 812, and (b) the collar interruption be sufficient to pass the service therethrough.

It is to be understood that the ears on both ends of the clamp 811 may be eliminated and replaced by any other suitable conventional fastening means, e.g, a set screw passing through the front of the clamp to engage the conduit.

It is also to be understood that the interruption in the collar may be located at any other place where entry of the service therein may be facilitated.

Replacement of an installed service entrance head by this embodiment requires removal of the installed head by any suitable means including destruction leaving the service in place. The collar may then be positioned around the service with the service entering through the open back. The collar may then be positioned on the conduit and secured thereto. The service may then be pulled forward and downward and the cap installed on the collar.

Where the service includes plural cables, a unitary insulator such as illustrated in FIG. 18 or FIG. 20 may be placed over the service separating the cables by introducing them into the slots at the top of the insulator before the cap is installed. If the insulator is segmented, the segments may be assembled around the cables. The insulator may then be positioned on the arms of the collar and the cap installed on the collar to keep the insulator in place.

While the present invention has been described in detail with respect to specific exemplary embodiments and methods, those skilled in the art, upon attaining an understanding of the foregoing may readily produce alterations to, variations of, and equivalents to such embodiments. Accordingly, the scope of the present invention is to be determined solely by the claims when accorded a full range of equivalents.

What is claimed is:

1. In a service entrance head through which a service cable passes to enter a cable conduit,
    said service entrance head being adapted to inhibit the entrance of water, insects and debris into the cable conduit and including:
        a cap overlying the service cable where it enters the cable conduit, and
        a collar through which the service cable passes to enter the cable conduit for supporting the cap, said collar being adapted for removable attachment to the collar to the cable conduit,
    the improvement wherein said collar is constructed to be removably installed around the service cable in effecting installation of the service entrance head without the necessity for passing the end of the cable service through an aperture in said collar.

2. The service entrance head of claim 1 wherein said collar includes at least one set screw passing through said collar in engagement with the service conduit.

3. The service entrance head of claim 1 wherein said collar includes a clamping element conforming generally to the shape of and in contact with cable conduit.

4. The service entrance head of claim 1 wherein said collar is segmented.

5. The service entrance head of claim 1 wherein said collar is unitary.

6. A service entrance head through which a service cable passes to enter a cable conduit, said service entrance head being adapted to inhibit the entrance of water, insects and debris into the service conduit and including:
    a cap overlying the service cable where it enters the conduit,
    a conduit collar through which the service cable passes to enter the conduit for supporting the cap, and
    a segmented clamp for removably attaching the conduit collar to the conduit,
    said conduit collar being segmented to facilitate the removable installation thereof around the service cable without the necessity for passing the end of the service cable through an aperture in said collar.

7. The service entrance head of claim 6 wherein one of the segments of said conduit collar is integral with one of the segments of said clamp.

8. The service entrance head of claim 6 wherein each of the segments of said conduit collar is integral with one of the segments of said clamp.

9. The service entrance head of claim 6 wherein said conduit collar includes a mechanical support for an electrically insulating wire separator.

10. The service entrance head of claim 9 including a wire separator having a plurality of sections removable to create an open space therein through which a portion of said service cable may pass, the open spaced created by the removal of at least one of said plurality of removable sections not extending to the radial edge of said wire separator.

11. The service entrance head of claim 9 including a wire separator having a plurality of sections removable to create an open space therein through which a wire of said service cable may pass, the open spaced created by the removal of at least one of said plurality of removable sections extending to the radial edge of said wire separator.

12. The service entrance head of claim 9 wherein said wire separator is segmented to facilitate the removable installation thereof with each of the wires of said service cable passing through one of the open spaces in said wire separator without the necessity for passing the end of the wires through said open space.

13. The service entrance head of claim 6 wherein said mechanical support for a wire separator includes two arms configured to engage the wire separator, said engagement being spring biased by the flexibility of said two arms.

14. The service entrance head of claim 6 wherein said conduit collar includes an electrically insulating wire separator.

15. The service entrance head of claim 14 wherein said conduit collar is integral with said wire separator; and
wherein said integrated conduit collar and wire separator are made of electrically insulative material.

16. A service entrance head through which a service cable passes to enter a cable conduit, said service entrance head being adapted to inhibit the entrance of water, insects and debris into the service conduit and including:
a cap overlying the service cable where it enters the conduit, and
a unitary conduit collar through which the service cable passes to enter the conduit for supporting said cap,
said unitary collar including a peripheral gap through which the service cable may enter the conduit without passing the end of the service cable through an aperture in said collar,
said peripheral gap being sufficiently narrow that said collar provides a surface to pressurely engage the conduit on the side thereof where said gap is located, and
said unitary collar including a pressure producing clamp on the side thereof generally opposite to the side where said gap is located.

17. The service entrance head of claim 16 wherein said pressure producing clamp is at least one set screw.

18. The service entrance head of claim 16 wherein said pressure producing clamp includes a curved surface conforming generally to the shape of the conduit.

19. The service entrance head of claim 16 wherein said gap is located generally opposite to the direction the service exits the service entrance head.

20. A unitary conduit collar adapted to substantially surround a service conduit providing conduit-shape conforming conduit engaging surfaces,
said unitary collar including a peripheral gap on one side and a pressure applying clamp on the opposing side,
said gap being sufficiently wide enough to permit the passage of the service therethrough from the conduit into the interior of the collar, and
said gap being narrow enough for said collar to provide a pressure surface opposing the pressure of said clamp.

21. A method of installing a service entrance head for a service through which the service cable passes into a cable conduit to reduce the entrance of water, insects and debris into the conduit, said method comprising the steps of:
(a) providing a service entrance head having:
(1) a cap for overlying the service cable where it enters the conduit,
(2) a segmented conduit collar through which the service cable passes to enter the conduit for supporting the cap, and
(3) a clamp for removably attaching the conduit collar to the conduit,
(b) placing the segments of the conduit collar around the conduit and around the service cable;
(c) joining the segments of the conduit collar;
(d) attaching the conduit collar to the conduit; and
(e) supporting the cap by the conduit collar,
thereby installing the service entrance head without passing the end of the service cable through the conduit collar.

22. A method of installing a service entrance head for a service through which the service cable passes into a cable conduit to reduce the entrance of water, insects and debris into the conduit, said method comprising the steps of:
(a) providing a service entrance head having:
(i) a cap for overlying the service cable where it enters the conduit,
(ii) a unitary conduit collar through which the service cable passes to enter the conduit for supporting the cap, said collar having a peripheral gap on one side and a pressure clamp for applying pressure to the conduit from the side opposite the gap,
(b) placing the collar around the conduit and around the service cable;
(c) applying pressure from the pressure clamp to attach the collar to the conduit; and
(e) supporting the cap by the conduit collar,
thereby installing the service entrance head without passing the end of the service cable through the conduit collar.

* * * * *